United States Patent [19] [11] 3,925,577
Fatzer et al. [45] Dec. 9, 1975

[54] SILICON CARBIDE COATED GRAPHITE MEMBERS AND PROCESS FOR PRODUCING THE SAME

[75] Inventors: Elmer G. Fatzer, Brunswick, Ohio; Edgar L. Kochka, Pittsburgh, Pa.

[73] Assignee: Westinghouse Electric Corporation, Pittsburgh, Pa.

[22] Filed: Nov. 24, 1972

[21] Appl. No.: 309,591

[52] U.S. Cl. ............... 427/249; 427/253; 427/314; 427/399; 428/408; 428/446; 428/538
[51] Int. Cl.² ......................................... C23C 11/08
[58] Field of Search.... 117/47 R, 47 H, 118, 106 R, 117/106 A, 106 C, 69, 169 A

[56] References Cited
UNITED STATES PATENTS

| | | | |
|---|---|---|---|
| 2,677,627 | 5/1954 | Montgomery et al. | 117/118 X |
| 2,828,231 | 3/1958 | Henry | 134/1 |
| 2,992,127 | 7/1961 | Jones | 117/118 X |
| 3,019,128 | 1/1962 | Smiley | 117/160 R X |
| 3,095,316 | 6/1963 | Hartwig | 117/16 |
| 3,140,193 | 7/1964 | Kane | 117/118 X |
| 3,164,489 | 1/1965 | Timper | 117/118 X |
| 3,329,527 | 7/1967 | Harris | 117/106 A X |
| 3,385,723 | 5/1968 | Pickar | 117/169 A X |
| 3,393,085 | 7/1968 | Howard et al. | 117/106 R X |
| 3,406,044 | 10/1968 | Harris | 117/106 C X |
| 3,459,504 | 8/1969 | Bracken et al. | 117/106 R X |
| 3,493,423 | 2/1970 | Hartwig | 117/69 X |

FOREIGN PATENTS OR APPLICATIONS

| | | | |
|---|---|---|---|
| 680,237 | 2/1964 | Canada | 117/118 |
| 750,329 | 1/1967 | Canada | 117/106 C |

*Primary Examiner*—William D. Martin
*Assistant Examiner*—Stuart D. Frenkel
*Attorney, Agent, or Firm*—R. T. Randig

[57] ABSTRACT

A preferred process for producing coated isotropic graphite members comprises:
  a. heat treating the isotropic graphite member to a temperature from about 1700°C to 2400°C in a halogen atmosphere comprising chlorine or fluorine to reduce the impurity ash content to the range of the order to 2 to 10 ppm,
  b. machining the heat treated isotropic graphite member to a predetermined shape and surface condition,
  c. ultrasonically cleaning the machined graphite body in a liquid cleaning fluid to remove loose surface particles,
  d. depositing a layer of silicon on the clean graphite body by a gas phase reaction at a temperature above 1000°C but below the melting point of silicon,
  e. heating the graphite member with the applied layer of silicon to a temperature to cause the silicon to melt and penetrate the pores of the graphite and cause the silicon to react completely in situ with the graphite to form a layer of silicon carbide penetrating to a depth of at least about 5 mils, and
  f. depositing by a gas phase reaction a sealing layer of silicon carbide over the underlying, previously reacted silicon carbide layer.

6 Claims, 6 Drawing Figures

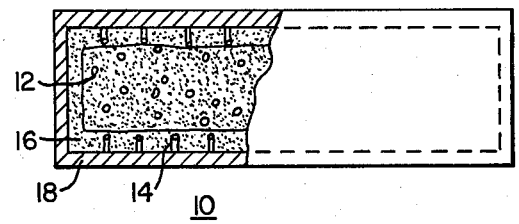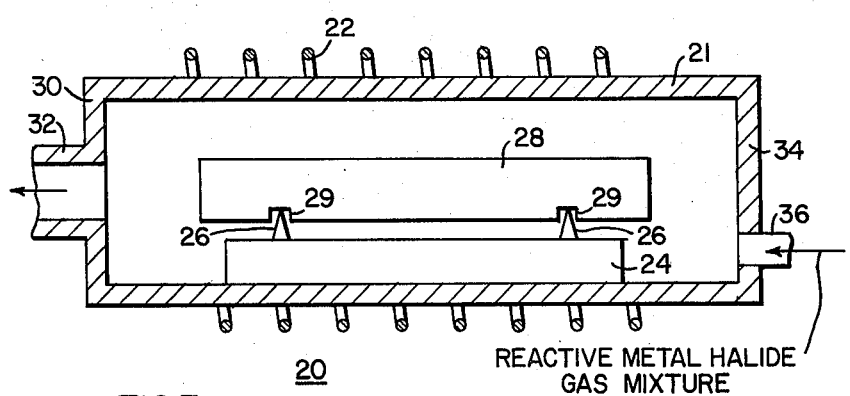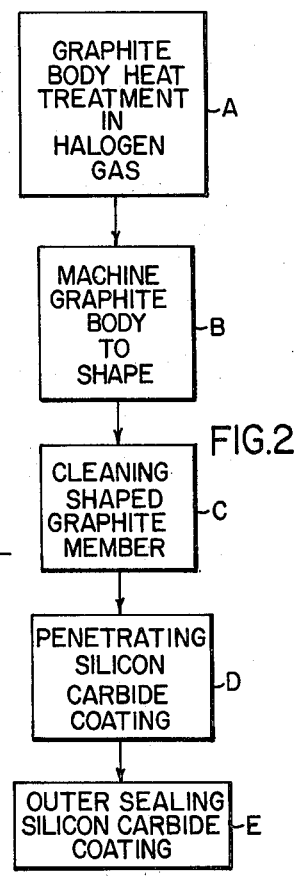

SILICON CARBIDE COATED GRAPHITE MEMBERS AND PROCESS FOR PRODUCING THE SAME

PRIOR ART

The manufacture of isotropic graphite bodies for various applications is well known in the art. A discussion of the manufacture of isotropic graphites is set forth for example in the AEC-NASA Tech Brief 71-10042, entitled "Producing Graphite With Desired Properties." Numerous commercial manufacturers produce isotropic graphites of various kinds.

Isotropic graphite bodies may be obtained commercially over a relatively wide range of characteristics. Thus, the grains or particles of the graphite body when a cross-section is viewed under the microscope and measured, may vary from coarse grains of as much as 0.005 inch when measured along the average diameter down to fine grain products in which the maximum particle size is less than 0.001 inch. The coefficient of thermal expansion over the range of, for example room temperature to 1,000°C, may be from below 4.0 to as much as about 8.3 inch per inch per °Centigrade $\times 10^{-6}$. The density of such isotropic graphites may vary from about 1.5 to 1.9 grams per cc. All isotropic graphites have some pores present and their density is a function of the pore volumes. The size, shape and distribution of the pores may vary from irregular large, randomly distributed pockets to relatively uniform fine pores. In many cases, the pores, both large and small, are completely enclosed and do not extend to the surface of the body or member produced therefrom, while in other cases a high proportion comprises an interconnected pore structure or the pores may comprise capillary passages, and thus most of such spaces or pores may extend to the surface of the body.

The manufacture of isotropic graphites generally comprises the steps of combining ground green coke, produced by oil refineries, which is calcined at elevated temperatures and then combined with pitch, usually ground solid pitch, in certain selected proportions. The mixture is then compressed at pressures of from 2 to 10,000 psi into bodies of various sizes. These bodies are usually given an intermediate heat treatment of from 1 to 24 hours at temperatures of from about 800° to 900°C. The resultant bodies are then placed in a graphitizing furnace where they are subjected to temperatures of the order of 2400°C to 2800°C by passing an electrical current through the body for a period of time of the order of several hours. During this treatment, the carbon is converted to graphite and any volatile hydrocarbons, sulfides and other materials which gasify at these elevated temperatures are driven off.

Such graphitized members have been employed for structural members for elevated temperature use, for dies for molding ceramics and metals, for chemical applications in the form of pipes, tanks, and pumps, and as electrical anodes or the like in electroplating and other applications. Difficulties have been encountered in such applications of graphite bodies, particularly when subjected to electrical fields and especially in high vacuum systems. In a high vacuum, for example, such as that present in an X-ray tube, the graphite, particularly when bombarded with electrons, tends to give off fine particles of graphite which coat the surfaces of the device and may impair its electrical properties. In addition, in isotropic graphites having a high proportion of closed pores, gases are slowly evolved by a diffusion process from internal pores through graphite cell walls, which internal pores have not been fully degassed in earlier processing, and the vacuum is deteriorated thereby. No reasonable degasification procedure is known that can satisfactorily degas such closed pore graphites.

While it has been proposed to coat graphite members in order to seal the surfaces, the experience has been that such coatings have not adhered adequately to the graphite member because of a layer of loose particles on the surfaces, and for other reasons particularly where the coating is merely deposited on the surface without penetrating into any interstices or pores, so that when temperature gradients are set up in use, the applied coatings have peeled, cracked or broken off in use and unsatisfactory results have followed.

SUMMARY OF THE INVENTION

In accordance with this invention, it has been discovered that certain isotropic graphite members having a high density of at least about 1.75 grams per cc and a coefficient of thermal expansion of 7.5 to 8.3 inch per inch per degree Centigrade $\times 10^{-6}$, over the range of from 0° to 1,000°C, and characterized by fine grains of a maximum particle size of less than 0.001 inch and having a relatively uniform distribution of many interconnected fine pores extending to the surface of the member, may have applied thereto a two part refractory silicon carbide coating which is firmly bonded to and conforms to the surface of the isotropic member. This arises in part by reason of the fact that the refractory silicon carbide coating is applied by two successive different processes to the isotropic graphite member, the first, an infiltrating silicon deposit that enters the pores and crevices of the graphite and reacts in situ to form an underlying layer of silicon carbide extending to a depth of 0.005 inch, and preferably 10 mils or more, and a second superimposed sealing silicon carbide coating layer bonded to the first layer. A particular preliminary processing technique also provides that no loose particles are present between the coating and the substrate.

A process is employed in which the steps are initially heat treating the isotropic graphite member, subsequently machining or shaping the heat treated isotropic graphite member to a predetermined shape or form, then cleaning the shaped isotropic graphite member to remove all loose surface particles, and finally applying to the so processed graphite member a silicon carbide coating in two steps, which coating will have penetrated relatively deeply into the graphite surface and adheres very firmly to and conforms to the surface of the isotropic graphite member to a degree unavailable in the art heretofore.

Such refractory silicon carbide coated graphite members are eminently suited for a wide variety of chemical and thermal applications. Chemical apparatus including tanks, reactors, pipes, pumps, valves, and the like may comprise the silicon carbide coated isotropic graphite components. Both aqueous solutions of strong mineral acids and alkalis are withstood very well by the silicon carbide coated isotropic graphite members. Abrasive slurries and other abrasive materials or atmospheres can be handled by such components or members with outstanding wear resistance. The silicon carbide coated isotropic graphite has a very high radiant energy emissivity and thereby the heat is dissipated more efficiently and better than with many other known materials. Furnaces, electrical heating devices and other high temperature apparatus exposed to air, or reducing atmospheres, can employ the silicon carbide coated isotropic graphite members of this invention advantageously.

For a better understanding of the nature and objects of the present invention, reference should be had to the following detailed description, in which the drawings comprise:

FIG. 1 is an elevation partly in cross section of a silicon carbide coated isotropic graphite member;

FIG. 2 is a block diagram of the process steps for producing the silicon carbide coated graphite member;

FIG. 3 is a vertical cross sectional view through a coating apparatus;

DETAILED DESCRIPTION

Figure 4:
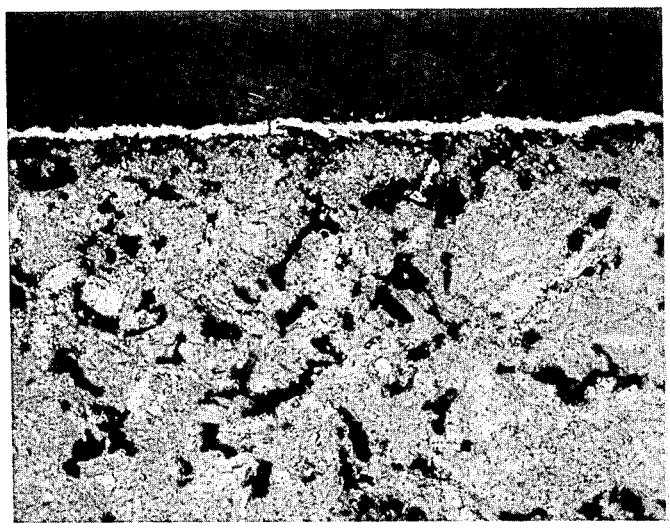
FIG. 4 is a photomicrograph at 400× of a coated conventional isotropic graphite.

Referring to FIG. 1, there is illustrated a composite structure 10 comprising a shaped member 12 which comprises fine grained isotropic graphite of a density of at least about 1.75 grams per cc, of a coefficient of thermal expansion over a temperature range of from 0°C to 1,000°C of 7.5 to 8.3 inch per inch per degree Centigrade $\times 10^{-6}$, in which the grains are of maximum particle size of not more than about 0.001 inch and characterized by a relatively uniform distribution of interconnected fine pores 14 of an average diameter of about 5 microns and less, most of the pores extending to the surface of the member, and the porosity equal to about 18% to 25% of the member volume. Such high density, fine grained isotropic graphites have great strength at room temperature: from 16,000 to 28,000 psi in compression, a flexural strength of from 10,000 to 16,000 psi; and a tensile strength of from 6,000 to 10,000 psi. At elevated temperature these physical strengths increase and improved properties desirable for many uses are realized.

It will be understood that such isotropic graphite bodies may exhibit even higher physical properties and thermal shock resistance properties, particularly if they are prepared from carbonaceous materials other than petroleum cokes and pitch.

The surface of the isotropic graphite member 12 is provided with an initial penetrating deposit 16 of silicon carbide to a depth of at least 0.005 inch, in order to assure all pores or openings are filled and the silicon carbide is highly adherent to the graphite body. Thereafter a relatively smooth sealing outer surface layer 18 of silicon carbide is applied. This surface layer 18 is essentially flaw free and may be of a thickness of at least about 0.3 mil, and preferably 0.5 mil and greater.

To obtain the outstanding properties of the silicon carbide coated-isotropic fine grain graphite as set forth herein, it is important that the isotropic graphite have the characteristics above listed. The adherence and conformity of the silicon carbide coating can only be obtained to the degree desired with substrates comprising these selected fine grained, isotropic graphites with interconnected porosities extending to the surface. Experiments with other isotropic graphites whose properties depart significantly from the above have resulted in far less satisfactory composites. The latter composites exhibited separated, cracked or spalled coatings when subjected to high temperatures of 1,000°C to 1,200°C, and when strains were applied they became unsatisfactory.

In order to secure optimum adherence of the silicon carbide coating to the isotropic graphite, it is important to process the graphite following the treatment steps as set forth in FIG. 2 of the drawing. Briefly, a block or large body of the isotropic graphite is first heat treated at step A in a reactive halogen gas for at least an hour at a temperature of from 1,700°C to 2,400°C. Suitable reactive halogen gases may comprise chlorine, hydrogen chloride or the Freon gases, such for example as dichlorodifluoromethane, monofluorotrichloromethane and difluorotetrachloroethane. Admixtures of these halogen gases with inert gases, an example of a suitable mixture being 50% argon and 50% (by volume) hydrogen chloride, have given good results. A preferred heat treatment temperature is in the range of from 1,900° to 2,200°C. The treatment time may extend up to several days with no detrimental results. This initial heat treatment as shown in block A in FIG. 2 has as its purpose to clean the graphite body of components that will react with halogens and to remove such various impurities.

In particular, the heat treatment of the isotropic graphite in the reactive halogen gas atmosphere will reduce the ash content of the graphite from the usual range of from 200 to 1,000 ppm, to a very low level. For example, fine grained isotropic graphites with an ash content totaling about 300 ppm and comprising primarily compounds of iron, silicon, aluminum, vanadium and titanium with traces of magnesium, boron and nickel, when so heat treated in an argon-hydrogen chloride atmosphere had a final ash content of from 2 to 10 ppm.

Following the heat treatment of the isotropic graphite body in a halogen gas in step A of FIG. 2, the heat treated body is machined at step B to a predetermined or desired shape. The machining may include grinding, milling, filling, drilling, planing, or any operation otherwise producing the desired shape and surface condition for the member. Machining to precise dimensions and a smooth surface is readily accomplished because of the extremely fine grain texture of the graphite body. For many purposes, the surface should be relatively smooth and of a roughness that does not exceed above 100 micro inches RMS.

The machining produces a certain quantity of more or less adherent fine graphitic particles or dust, as well as partially loosened particles, on the surface of the member. Therefore, it has been found necessary to subject the shaped member to a surface cleaning step, indicated at block C in FIG. 2, which comprises ultrasonic cleaning of the graphite member, preferably in a halogenated liquid. Examples of suitable cleaning liquids are trichloroethylene and liquid Freons, such for example as trichlorotrifluoroethane. An example of a process accomplishing such ultrasonic cleaning comprises immersing the member in a trichloroethylene bath where it is subjected to violent agitation at an ultrasonic frequency of, for example, from 20,000 to 50,000 Hertz. The ultrasonic cleaning removes all loose particles from the surface of the isotropic graphite member and opens up any pores at the surface which have been plugged or closed by particles moved or pushed in during the machining steps.

The shaped and cleaned isotropic graphite member is now ready for the penetrating silicon carbide in situ deposit to be applied in step D of FIG. 2. This is accomplished by depositing silicon metal by a gas phase reaction of a silicon halide and a reducing gas on the surfaces of the isotropic graphite member so that the silicon is present at or partially penetrates into the exposed pores and crevices while the graphite is at least at 1,000°C, but below the melting temperature of the silicon.

For depositing silicon on the member in step D, the reactants comprise a reducing gas such as hydrogen and a gaseous reducible silicon compound such as silicon tetrachloride. Argon or another inert diluent gas may be present. The gas mixture is flowed over the previously cleaned isotropic graphite member which is at a temperature of about 1000°C or higher, at 1350°C for example, so that the silicon compound is reduced at the hot graphite surfaces and elemental silicon is deposited thereon.

After a sufficient quantity of silicon has been deposited, the silicon deposition may be terminated and the silicon coated graphite member is heated to a temperature of above 1400°C so that the silicon melts, flows and diffuses into and infiltrates deeply into the graphite porosities by capillary action to a depth of the order of 5 to 10 mils or more, and at these temperatures the grahpite reacts readily with the silicon to form silicon carbide in situ. A time of one hour or more is adequate for this latter step. The silicon carbide so formed has penetrated into and pretty well fills all exposed pores and crevices. The surface corresponds essentially to the general texture and roughness of the original graphite surface except for the graphite involved in the reaction with silicon, though in some cases it is a somewhat smoother surface.

Thereafter, the isotropic graphite member is treated at step E of FIG. 2 to provide a sealing coating of silicon carbide over all the surfaces of the member produced in step D. Silicon carbide is deposited by a gas phase reaction involving a gaseous carbon compound and a silicon compound, such as a hydrocarbon gas admixed with a chlorosilane, for example silicon tetrachloride and methane, plus a reducing gas having no carbon atoms therein in order to improve the reaction, such as hydrogen. Since no graphite from the isotropic graphite member is used in this step, the silicon carbide deposits smoothly and uniformly on all exposed surfaces.

The processes of steps D and E may be carried out in separate furnaces, but the most practical procedure is to carry them out consecutively in a single furnace with appropriate sequential programming of temperature, times, gas compositions and selected flow rates.

Referring to FIG. 3 of the drawing, there is illustrated a suitable apparatus for carrying out the deposition of the silicon carbide on the graphitic members. The apparatus 20 comprises a non-reactive, refractory tube 21, for example of quartz or similar material, which is relatively inert to the effect of high frequency electrical fields. A high frequency induction coil 22 is disposed about the exterior of the tube 21. Within tube 21 is a support 24 of quartz, for example, having a plurality of pins or other point type projections 26 on which is placed the machined and cleaned isotropic graphite member 28 to be held in an exposed elevated position. The graphite member 28 is preferably, though not necessarily, prepared with a plurality of indentations 29 into which the projections 26 enter so as to position the member 28 for free flow of gases about all of the surfaces to be coated with the silicon carbide.

A removable closure 30 is applied to the one end of tube 21 to enable the graphite member 28 to be positioned within the tube and then the tube closed. The closure 30 includes an exhaust gas outlet 32 out of which spent reaction gases are withdrawn. The other end of the tube 21 is provided with a closure 34 having an inlet tube 36 through which the mixture of silicon halide gas, a reducing gas and inert gas may be introduced for flow over the isotropic graphite member. If desired, several separate tubes 36 may be provided, each introducing one of the gases with admixing taking place in the tube 21 near the closure 34.

In operation, the shaped isotropic graphite member 28 is placed within the tube 21 upon the supports 26 and the tube is preferably swept out with a flow of a purifying gas, for example, pure argon gas, until all oxygen, moisture, nitrogen and the like adsorbed gases have been removed. During the sweeping out process, the high frequency coil 22 is energized so that the graphite member is heated thereby and brought up to the desired reaction temperature. When heated, the graphite will emit adsorbed gases more freely and thereby assist in the removal of any adherent gaseous impurities by the argon gas stream. In some cases a vacuum may be applied to the hot graphite member in tube 21 so as to expedite cleaning and degassing. Thereafter, a suitable reactive gas mixture is introduced into a tube and caused to pass over the cleaned graphite member to produce and deposit the desired silicon metal on the surfaces thereof. It has been found that the reactive gases will deposit silicon metal even into the indentations 29, consequently all surfaces are fairly evenly coated, and some silicon may penetrate into the pores or crevices exposed at the surfaces of the graphitic member. Some reaction with the graphite will occur.

After an hour or more, when an adequate amount of silicon has been deposited on the surfaces of the graphitic member, the reactive gas flow is terminated except for an inert gas such as argon, and the temperature of the silicon coated graphitic member is increased above the melting temperature of silicon, for example to about 1420°C to 1500°C, preferably to 1450°C, to cause the silicon to melt and diffuse and infiltrate into the graphitic surfaces via any pores. The silicon and graphite will react to form silicon carbide in situ. When properly done, pores and crevices to a depth of 5 mils or more are filled with the solid silicon carbide as will be evident in FIG. 5 of the drawings. It appears that the pores are infiltrated with liquid silicon since some authorities state that silicon carbide does not pass through a liquid phase, but dissociates beginning very slowly at about 2050°C, and dissociation increases more rapidly up to about 2800°C. There is some evidence that a liquid-like state may be reached when silicon carbide is heated to about 2600°C.

After infiltration of the surface of the graphitic member with silicon carbide produced by reaction with silicon in situ to a depth of about 5 mils or more, the graphitic member may be cooled to a temperature from about 1000°C to 1100°C and a gas mixture comprising hydrogen, a hydrocarbon and a halogenated silane, as well as an inert diluent gas such as argon, is passed over the hot silicon carbide infiltrated graphitic member to deposit a sealing surface coating of silicon carbide thereon. All the surfaces will be smoothly and evenly coated with silicon carbide to a thickness of at least 0.3 mil, and preferably 0.5 mil or more.

If desired, after this last step, the silicon carbide coated graphitic member may be heated for a period of time at an elevated temperature in an inert gas, for example for an hour in argon at a temperature of 1600°C to equilibrate the graphite-silicon carbide infiltrated transition region with the ceramic-like all silicon carbide surface coating.

While many graphite bodies have been produced in the industry and designated as isotropic graphite bodies, they are available with a relatively wide variety of characteristics. Thus, for example, the density may vary from as little as about 1.5 to as much as 1.88 gr/cc and higher, the electrical resistivity in micro-ohms per centimeter may vary from as little as about 1,000 to about 6,000, the coefficient of thermal expansion may vary from as little as 3.97 to as much as 8.3 inch per inch per degree Centigrade $\times 10^{-6}$ and the particle size may vary from a maximum particle size of 0.003 to 0.005 inch or greater down to less than 0.001 inch. The porosity can also vary extensively and may range from structures comprising large, randomly distributed pockets which are completely enclosed to fine capillary pore networks which extend to the surface. The latter pore structure is particularly desirable for vacuum applications since such a graphite structure degasses quite readily to a substantially gas free condition. As disclosed previously, for the practice of this invention there should be employed the high density (1.75 gr/cc or greater), fine grained, fine pored graphites whose pores comprise networks extending to the surface of the body, as defined previously.

In order to illustrate graphically the differences between the various isotropic graphites with coatings applied thereto, reference should be had to FIG. 4 which is a photomicrograph at a magnification of 400X, one of the better conventional isotropic graphites with an applied single silicon carbide coating, deposited as silicon carbide, on the surface thereof. The large grain size and the relatively large, irregularly distributed pores are clearly apparent. This particular graphite does not constitute the type of graphite needed to obtain the full benefits of this invention since the results will be relatively unsatisfactory. Also the silicon carbide coating is flawed and cracked. It is present on the surface only and has not penetrated into the graphite pores.

If such a member were to be exposed to an oxidizing atmosphere at an elevated temperature, e.g. at 1500°F, the gas would penetrate to the graphite and would oxidize it beneath each crack and eventually the loss of graphite below the silicon carbide coating would lead to chipping or spalling of the unsupported silicon carbide coating.

Figure 5:
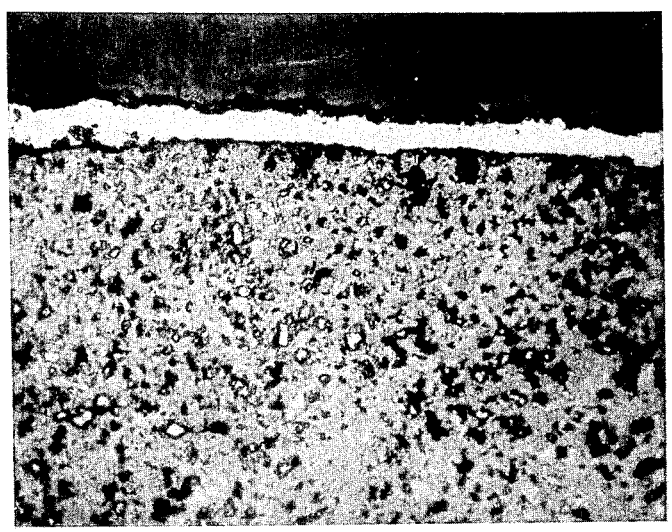
FIG. 5 is a photomicrograph at 400× of a silicon carbide coated high density, high thermal coefficient fine grained isotropic graphite.

FIG. 5 is a photomicrograph made at a magnification of 400X of the type of isotropic, high density, fine grain graphite with fine interconnecting pores and having the properties previously listed as critical, which isotropic graphite has been found to give outstanding results in the practice of the invention. The differences in the isotropic graphites in the two figures are quite apparent, and that of FIG. 5 is clearly far superior. This latter graphite is available as AXF-5Q grade graphite. A superimposed silicon carbide surface coating of a thickness of about 0.3 mil has been deposited on the surface of the graphite above an infiltrating deposit of silicon carbide which has penetrated more than 5 mils into the pores of the graphite as is evident from the fine white silicon carbide particles distributed in the body of the graphite. It will be observed that the superimposed silicon carbide coating conforms closely to the graphite surface to which it has been applied. The dual silicon carbide coating adheres extremely well and tests have indicated that it will resist disruption or separation on being subjected to high temperature heating as well as to substantial mechanical strains and stresses.

Figure 6:
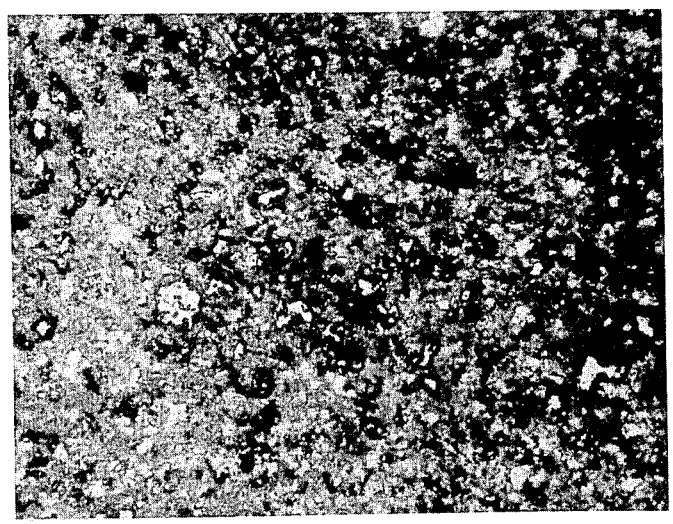
FIG. 6 is a photomicrograph at 750× of a portion of the silicon carbide infiltrated graphite body of FIG. 5.

Referring to FIG. 6 of the drawing, there is illustrated a portion of the silicon carbide infiltrated graphite substrate below the surface of the FIG. 5 member, at a magnification of 750X. The extensive white silicon carbide infiltration and penetration of the pores of the graphite body are clearly evident from this photomicrograph.

The following examples are illustrative of the practice of the invention.

EXAMPLE I

A body of isotropic graphite of a density of between 1.8 and 1.88 and having a porosity structure and grain texture similar to that illustrated in FIG. 5 of the drawing was obtained as AXF-5Q isotropic graphite from Poco Graphite Incorporated. This body was processed as indicated in FIG. 2 of the drawing. Briefly, the body was heat treated for one hour at 2,000°C in an atmosphere comprising 50% of argon and 50% of gaseous hydrogen chloride, by volume. This treatment reduced the ash content of the graphite to less than 10 ppm. The purified isotropic graphite body was machined into a disk and then cleaned of loose particles by ultrasonic treatment at 20,000 Hertz while immersed in liquid trichloroethylene. The cleaned isotropic graphite disk was then placed in an induction coil furnace such as is shown in FIG. 3 of the drawing. High frequency electrical current passing through the induction coil created a high frequency electrical field that heated the disk to a nominal temperature of 1150°C. Pure argon gas was first passed over the disk to cause all residual gases to be swept out of the furnace chamber. Then the following gas mixture was passed over the graphite disk for 2 hours:

| | |
|---|---|
| Silicon tetrachloride | 1.0 lb/hour |
| Hydrogen | 10.0 liters/minute |
| Argon | 4.0 liters/minute |

A coating of silicon was deposited on all the exposed disk surfaces.

At the end of this period of 2 hours, the gas mixture flow was terminated and argon alone was admitted at the rate of 6.4 liters/minute.

The electrical field was increased to raise the disk temperature to 1450°C and this temperature was held for 2 hours. The silicon coating melted and penetrated into the graphite surface via the interconnected pores and then reacted in situ to silicon carbide which penetrated to a depth of some 15 mils into the graphite surface.

Thereafter the field applied by the electrical induction coil was reduced to cause the graphite disk to reach a temperature of 1150°C and the following gas mixture was passed around the graphite disk:

| | |
|---|---|
| Silicon tetrachloride | 1.0 lb/hour |
| Hydrogen | 8.5 liters/minute |
| Methane | 0.2 liters/minute |
| Argon | 4.0 liters/minute |

The gas mixture was passed over the disk for 2 hours and deposited a relatively uniform sealing coating of silicon carbide over all the exposed surfaces of the disk. The gas mixture flow was then terminated and only argon gas at 6.4 liters/minute was passed over the disk. The induction coil was energized to apply additional energy to the disk to heat it to 1600°C and held at this temperature for 2 hours in order to homogenize the applied coatings.

EXAMPLE II

A purified, machined and cleaned disk of isotropic graphite, grade AXF-5Q, prepared as in Example I, was placed in an induction coil heated furnace where it was brought to a temperature of 1300°C while pure argon gas was passed over the disk to remove all volatiles therefrom.

There was passed over the disk the following gas mixture:

| Silicon tetrachloride | 1.5 lbs/hour |
| Argon | 6.4 liters/minute |
| Hydrogen | 13 liters/minute |

After 2 hours, a coating of silicon had been deposited on the exposed graphite surfaces, and the gas mixture flow was terminated and only argon gas passed over the disk. The induction coil was energized to heat the disk to 1450°C for a period to 2 hours so that the silicon melted and infiltrated and diffused into the graphite surface porosities and reacted in situ to a depth of some 15 mils to fill all the pores with silicon carbide.

Thereafter the disk temperature was reduced to 1050°C and the following gas was passed over the disk for a period of 8 hours:

| Silicon Tetrachloride | 1.5 lbs/hour |
| Hydrogen | 13 liters/minute |
| Methane | 0.4 liter/minute |
| Argon | 6.4 liters/minute. |

A heavy deposit of silicon carbide had been deposited on all the surfaces of the previously silicon carbide infiltrated and impregnated graphite disk.

The induction coil of the furnace was operated to raise the disk temperature to 1600°C with only argon gas passing over the disk surfaces. This temperature was held for 1 hour in order to equilibrate the ceramic-like silicon carbide surface with the underlying silicon carbide impregnated graphite surface.

The resulting bodies of Examples I and II, and other shapes prepared in a similar manner, can be employed for numerous chemical, furnace and electrical applications. The silicon carbide coated graphite members can be used as crucibles, molds for metal casting, stoppers for crucibles containing molten metal for both ferrous and non-ferrous metals. The silicon carbide coated graphite members can be used as hot pressing dies for metallic powders and ceramic materials. The disks of Examples I and II can be employed as anodes for rotating anode X-ray tubes, as supporting members and other components of electronic tubes. The rotating anodes can comprise the silicon carbide coated graphite with a peripheral ring of tungsten or tungsten-rhenium alloy applied thereto upon which latter the electron beam can impinge. Semi-conductor processing, boats, trays and support fixtures for silicon wafers and the like can comprise the silicon carbide coated members to enable diffusion, epitaxial deposition and other high temperature treatment of silicon wafers requiring highest purity and non-contaminating conditions for the processing thereof.

Pipes, reaction vessels, pumps, stirrers, valves and other components of chemical apparatus can comprise the silicon carbide coated isotropic graphite components. Both corrosive acid and alkali chemicals will be withstood by the components, as well as abrasive solutions or slurries.

Gas turbine components can comprise the silicon carbide coated isotropic graphite, for example blades, ducts, nozzles and vanes may comprise such materials.

Even nuclear reactor components may comprise the composite graphite base materials of this invention. The graphite may function as a nuclear moderator while the silicon carbide coatings will withstand oxidation by contaminant oxygen or water vapors, and hydraulic erosion will be withstood in pressured water reactors or boiling water reactors. The silicon carbide coatings will contain any fission products generated within a graphite body so coated.

We claim as our invention:

1. In the process of applying a silicon carbide coating to a graphite member to produce a composite structure, the steps comprising
   a. heat treating at a temperature of from about 1700°C to 2400°C an isotropic graphite body comprising fine grained isotropic graphite of a density of at least 1.75 gm/cc and having a coefficient of thermal expansion of about 7.5 to 8.3 inch per inch per degree Centigrade $\times 10^{-6}$, the graphite grains being of a maximum particle size of less than 0.001 inch, and characterized by a relatively uniform distribution of many interconnected fine pores of an average diameter of about 5 microns and less, the pores extending to the surface of the body, the heat treating being applied for at least an hour in a halogen atmosphere, the halogen comprising at least one of the group consisting of chlorine and fluorine, the heat-treatment purifying the body to reduce the ash impurities to a range of the order of 2 to 10 ppm,
   b. machining the heat treated isotropic graphite body to a member of predetermined shape and surface condition,
   c. ultrasonically cleaning the machined body in a liquid cleaning fluid to remove loose surface particles,
   d. depositing silicon by a gas phase reaction on the surfaces of the cleaned isotropic graphite member while at a temperature of at least 1000°C but below the melting point of silicon, to provide an infiltratable layer of silicon on the surfaces,
   e. heating the silicon coated isotropic graphite member to a temperature and for a period of time to cause the silicon to melt and penetrate the pores and crevices of the graphite member and to react completely in situ with the graphite to form a layer of silicon carbide to a depth of at least about 5 mils, and
   f. depositing thereover by a gas phase reaction a sealing layer of silicon carbide on the graphitic member.

2. The process of claim 1 wherein the silicon deposition step (d) comprises passing a reactive gas mixture of silicon halide vapor, hydrogen, and an inert gas over the graphite member while the graphite member is at a temperature of at least about 1000°C, but below the melting temperature of the silicon whereby silicon is deposited on the graphite member from contact of the gas mixture therewith, the deposited silicon and the graphite being thereafter heated above the melting temperature of silicon for a period of time to cause it to infiltrate the pores of the graphite and thereafter to react completely in situ to form silicon carbide and the silicon carbide deposition step (f) comprises passing a reactive gas mixture of silicon halide vapor, a hydrocarbon gas, hydrogen and an inert gas, over the graphite member, to deposit a sealing layer of silicon carbide.

3. The process of claim 1, wherein the silicon carbide coating step (f) comprises heating the coated isotropic graphite member to at least about 1000°C and passing over the heated member a reactive gas mixture comprising a silicon halide, hydrogen and a hydrocarbon, whereby sealing coating of the refractory silicon carbide is deposited on the graphite member.

4. A composite structure comprising
    a. a substrate comprising a fine grained isotropic graphite member of a density of at least about 1.75 gm/cc, of a coefficient of thermal expansion of the order of 7.5 to 8.3 inch per inch per degrees Centigrade $\times 10^{-6}$, in which the grains are of a maximum particle size of less than 0.001 inch, and characterized by a relatively uniform distribution of many interconnected fine pores of an average diameter of about 5 microns and less, the pores extending to the surface of the member, and
    b. an all silicon carbide coating firmly bonded to and conforming to the surface of the isotropic member, the silicon carbide coating comprising a first portion infiltrated to a depth of at least about 5 mils into the pores of the surface of the isotropic graphite member and a superimposed sealing surface layer composed of silicon carbide, the composite structure having been produced by the process of claim 1.

5. The composite structure of claim 4, wherein the superimposed sealing surface layer portion of the silicon carbide coating is at least 0.3 mil in thickness.

6. A member suitable for use in chemical and metallurgical apparatus at temperatures of up to 3000°F and in contact with various chemicals and oxidizing and reducing gases comprising a shaped body having the structure and dimensions for such use thereof, the body comprising
    a. a substrate comprising a fine grained isotropic graphite member of a density of at least about 1.75 grams per cc, and a coefficient of thermal expansion of the order of 7.5 to 8.3 inch per inch per degrees Centigrade $\times 10^{-6}$, in which the grains are of a maximum particle size of less than 0.001 inch, and characterized by a relatively uniform distribution of many interconnected fine pores of an average diameter of about 5 microns and less, the pores extending to the surface of the member, a surface of the substrate being subject to the chemicals and gases while at the high temperatures when in use, and
    b. the said surface of the substrate having applied thereto an all silicon carbide coating firmly bonded and conforming to said surface,
said silicon carbide coating comprising a first underlying portion infiltrated to a depth of at least about 15 mils into the pores of the said surface of the isotropic graphite member and a superimposed sealing surface layer portion of a thickness of at least 0.5 mil, the member having been produced by the process of claim 1.

* * * * *